July 27, 1943.  H. NUTT ET AL  2,325,193

SPRING

Filed Aug. 31, 1939   6 Sheets-Sheet 1

$t$ - .098
$h$ - .264
$c$ - .070
$c:t$ = .71:1

Inventors:
Harold Nutt and
Richard L. Smirl.
By Edward C. Gritzbaugh
Atty.

July 27, 1943.  H. NUTT ET AL  2,325,193
SPRING
Filed Aug. 31, 1939  6 Sheets-Sheet 2
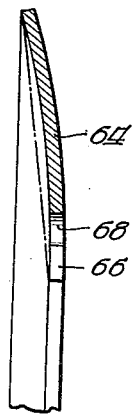
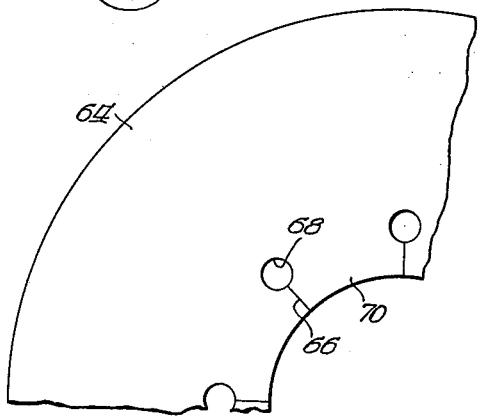
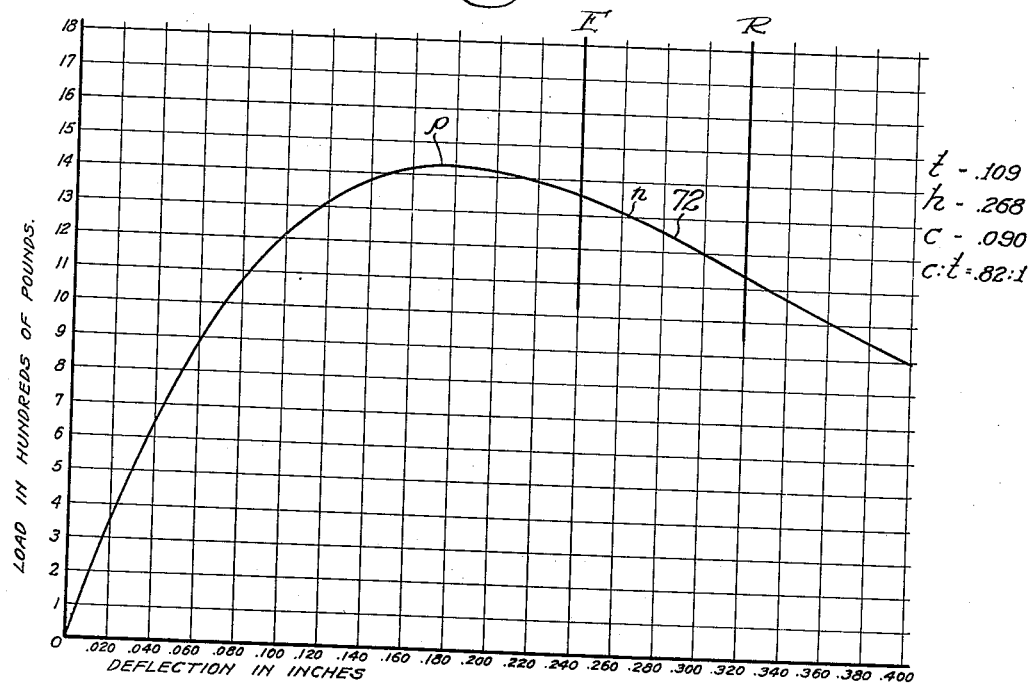
Inventors:
Harold Nutt and
Richard L. Smirl
By: Edward P. Gritzbaugh
Atty.

July 27, 1943.　　　H. NUTT ET AL　　　2,325,193
SPRING
Filed Aug. 31, 1939　　　6 Sheets-Sheet 3

Inventors:
Harold Nutt and
Richard L. Smirl
By: Edward P. Gritzbaugh
Atty.

July 27, 1943.    H. NUTT ET AL    2,325,193
SPRING
Filed Aug. 31, 1939    6 Sheets-Sheet 4

Inventors:
Harold Nutt and
Richard L. Smirl.
By: Edward C. Gritzbaugh
Atty.

July 27, 1943.   H. NUTT ET AL   2,325,193
SPRING
Filed Aug. 31, 1939   6 Sheets-Sheet 5

Inventors:
Harold Nutt and
Richard L. Smirl.
By Edward P. Gritzbaugh
Atty

Inventors:
Harold Nutt and
Richard L. Smirl.
By: Edward C. Gritzbaugh
Atty

Patented July 27, 1943

2,325,193

UNITED STATES PATENT OFFICE 2,325,193

SPRING

Harold Nutt, Chicago, and Richard L. Smirl, Bellwood, Ill., assignors to Borg-Warner Corporation, Chicago, Ill., a corporation of Illinois Application August 31, 1939, Serial No. 292,776

10 Claims. (Cl. 267—1)

This invention relates to washer type springs, and has as its general object to provide such a spring possessing characteristics which make it suitable for use in mechanisms wherein the load requirement is high, such as for example in providing the pressure for engagement of a motor vehicle friction clutch.

Springs of the type commonly called "Belleville washer" springs have been previously employed in friction clutches. Such springs are conical or roughly conical in shape, and the present invention also contemplates a spring which is roughly conical in shape so that its inner periphery is spaced axially from the plane of its outer periphery and approaches said plane as the spring is placed under compression.

Certain springs of this type have the characteristic of developing a resistance to deflection (load) which rapidly builds up under deflection of the spring from a completely unstressed position, until it reaches a peak (maximum useful load characteristic) then, under further deflection, levels off (low rate characteristic), and finally, as the deflection of the spring approaches a limit, again builds up.

The unidirectional low rate portion of the deflection curve of such a spring may have either a positive value (increase in resistance to deflection) or negative value (decrease in resistance to deflection) or a zero value (substantially no change in resistance to deflection) but in either case the change in resistance to deflection is small. The term "low rate" is intended to designate the small quantity of change in resistance to deflection in the low rate zone of deflection of such a spring. In employing the term "unidirectional," we refer to the continuance of the rate in a positive direction, or a negative direction, as the case may be.

In springs hitherto available, the unidirectional low rate zone of deflection is too narrow to embrace the operating range of deflection, and as a result, it has been necessary to embrace within the operating range, three zones of varying rate deflection.

The present invention has as its primary object to provide a spring of the conical washer type in which the range of unidirectional low rate deflection is greatly extended beyond that of prior springs of this general type, without sacrificing resilience or durability or increasing the dimensions of the spring. The term "resilience" as used herein, designates the capacity of the spring to store energy, when strained to its elastic limit.

Another object is to provide a spring which, in addition to the characteristics stated above, may have a deflection rate that is negative in character, i. e., wherein there is an appreciable load loss during deflection, whereby to reduce in a friction clutch, the amount of pressure required to hold the pedal in the released position, and the total amount of energy expended in effecting clutch release.

Another object is to provide a spring having a negative deflection rate extending over a range broad enough to embrace the entire operating range of the spring, and in addition, providing ample range to bring about an increase in load in response to facing wear so as to compensate for the loss of friction due to the smoothing of the facing and for any loss of load in the spring due to "taking a set."

Another object of the invention is to provide a spring in which the resilience may be increased without sacrificing either the range or the controllability of the low rate zone of deflection.

In this connection, it may be observed that in prior springs of the general type under consideration, there has been a definite limit, in a spring of any given dimensions, to the ratio between resilience and range of unidirectional low rate deflection, beyond which it was impossible to extend either of these characteristics without sacrificing the other.

Accordingly, the invention contemplates a method of extending either of these characteristics without impairing the value of the other, and, further, of simultaneously extending the value of both characteristics.

Another object of the invention is to provide a spring which has a sufficiently small diameter to form an element of the improved shallow type clutch disclosed in our pending application Serial No. 252,190, filed January 21, 1939, now Patent No. 2,219,129, October 22, 1940, of which the present application forms a continuation-in-part. In this respect, the invention involves solving the problem of combining in a washer type clutch spring, the mutually repugnant characteristics of small diameter, high resilience, negative rate characteristic, extended range of unidirectional low rate deflection, and resistance to fatigue.

These and other objects and features will become apparent from the following description when taken together with the accompanying drawings which form a part thereof, and in which:

Fig. 5 is an elevation of a portion of a spring embodying a modification of the invention;

Fig. 6 is an axial sectional view of the spring shown in Fig. 5;

Fig. 7 is a graph showing the deflection curve of the spring shown in Figs. 5 and 6;

Figure 1:
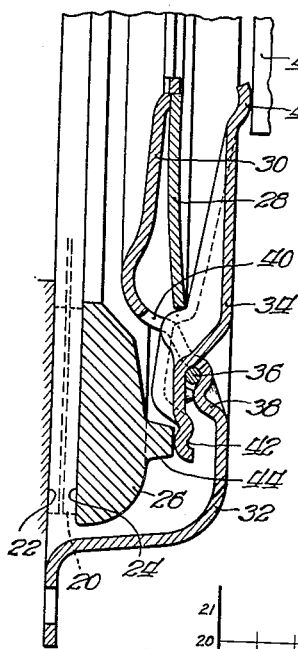
Fig. 1 is an axial sectional view through a portion of a motor vehicle friction clutch embodying the invention.

Since the present invention has been developed primarily for application in a friction clutch, we will first briefly describe the clutch shown in Fig. 1, which is a desriable arrangement in which the characteristics of the present invention are particularly useful. Such a clutch may embody the conventional driven plate 20, adapted to be clamped between friction faces 22 and 24 respectively of a fly wheel and a pressure plate 26, by pressure developed in the spring 28 of the present invention. The convex side of the inner periphery of the spring 28 is engaged against a reentrant central web portion 30 of the clutch cover 32, and the concave side of the outer periphery of the spring is engaged against a series of operating levers 34 each fulcrumed at 36 upon the reentrant shoulder region 38 of the cover 32. The levers 34 extend through openings 40 in the reentrant shoulder region 38, their outer ends 42 are engaged against bosses 44 formed on the pressure plate 26, and their inner ends 46 are engaged by a release bearing 48 forming part of the operating mechanism by means of which the clutch may be released.

Figure 2:
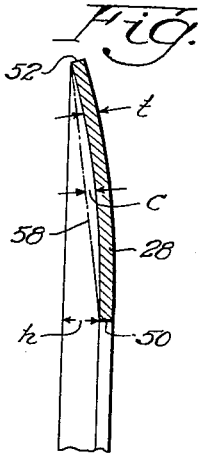
Fig. 2 is an axial sectional view through a clutch spring embodying the invention.
Figure 8:
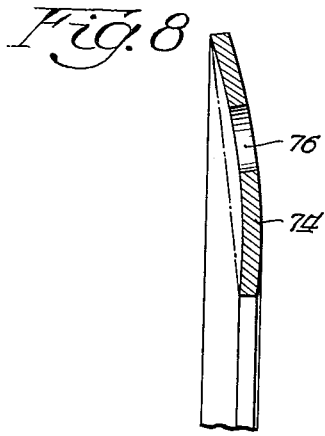
Fig. 8 is a sectional view of a spring embodying another form of the invention.

The spring 28, which in its unstressed condition shown in Fig. 2, is roughly conical with its inner periphery 50 spaced the distance $h$ from the plane of its outer periphery 52, is, when assembled in the clutch, pre-compressed so as to greatly reduce the distance $h$ thereby causing its inner region to become reentrant and, in some installations, to bring the inner periphery almost to the plane of the outer periphery. The spring may or may not be reentrant in its unstressed state. Fig. 8 illustrates an example of a spring that is somewhat reentrant. The springs illustrated in the remaining figures are not reentrant in the unstressed state but become so when preloaded. Pressure of the release bearing 48 against the levers 34 further compresses the spring 28, taking the load of the spring away from the pressure plate 26, and allowing the pressure plate 26 to be retracted by any suitable retracting means such as that shown for example in the pending application, Serial No. 277,239, filed June 3, 1939, now Patent No. 2,277,221, March 24, 1942, of David E. Gamble, to which reference is made for more detailed disclosure of the type of clutch under consideration. When the pressure on the thrust collar 48 is relieved, the levers 34 function to transmit the pre-loaded pressure of the spring 28 to the pressure plate 26.

The clutch arrangement just described has a number of advantages, one of which is compactness, and another of which is simplicity of construction. The achievement of these advantages, however, imposes upon the spring 28 the requirement that it be sufficiently small in diameter so that its maximum periphery is spaced radially inwardly from the fulcrum 36 so as to form the proper lever arm between the fulcrums 36 and the point of engagement of the spring against the lever. In the average motor vehicle clutch, this requirement limits the maximum diameter of the spring 28 to a trifle over six inches in the arrangement shown in Fig. 1. This is approximately two thirds of the diameter or about 50% of the area of the "Belleville washer" type of conical clutch springs that have been previously employed in motor vehicle clutches.

We desire to make it plain at this point that the invention is not restricted to springs limited to the diameter mentioned above, but may on the contrary be embodied in springs of much greater diameter. The basic problem upon which the invention was predicated, was the development of a sufficiently high resilience in a relatively small diameter spring.

In developing the spring for the particular arrangement shown in Fig. 1, the samples that have been tested have ranged from .085 inch to .120 inch in thickness and it is believed that for this particular use the best results can be secured only when the thickness is in the range above .075 inch.

With such a range of thicknesses in a spring having a maximum diameter of approximately 6 inches, the problems of securing the desired low rate, of keeping such low rate under control, (maintaining load capacity throughout the entire range of deflection), or incorporating into the spring the ability to stand up under a large number of flexings corresponding to the average number of clutch operations during the entire life of the average motor vehicle, without failure, and most important of all, of extending the range of low rate deflection so as to embrace considerably more than the operating range of the clutch, have proven to be outside the limitations of prior art springs. Other factors remaining the same, the reduction in outer diameter as compared to prior springs, decreases the range of deflection, and increases the likelihood of failure occurring.

All of the springs discussed hereinafter had an external diameter of approximately 6" and an internal diameter of approximately 2".

In the compression of a spring of the type under consideration, the outer peripheral region of the spring tends to spread, i. e., to develop circumferential tension, and the inner peripheral region tends to contract, i. e., to develop circumferential compression. The limits of flexibility, elasticity, and load capacity are restricted by the ability of the peripheral regions to absorb these distorting stresses, which, in the conventional conical spring, we have found to be confined largely to the peripheral regions, the intermediate region of the spring being largely neutral in action, resisting the tendency of the outer peripheral region to contract radially to compensate for its circumferential stretching.

Figure 17:
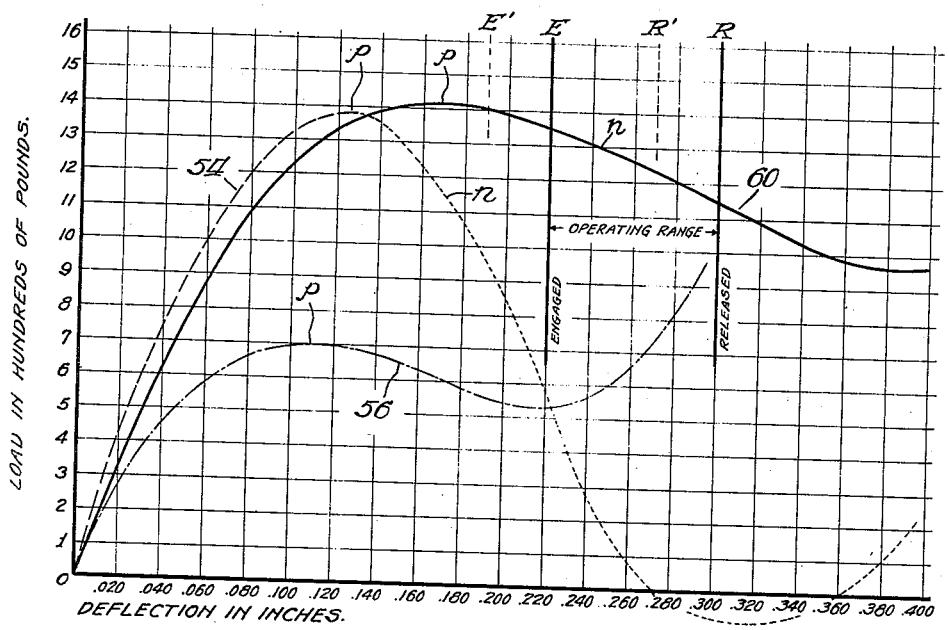
Fig. 17 is a comparative graph showing a family of deflection curves contrasting the characteristics of a spring embodying the invention with the characteristics of prior springs.

Attempts in the beginning to apply the teachings of the prior art to a spring having the proportions stated above, met with complete failure. A spring of conical shape, having a thickness of .095 inch and a height (the distance $h$ of Fig. 2) of .224 inch, developed a maximum load of 1385 pounds, but upon being deflected slightly beyond the point where such maximum load was attained, developed such a high negative rate that the load dropped rapidly to a point below zero, and the spring turned inside out, and remained in that position. The deflection curve of this spring is shown in Fig. 17, being indicated by the reference numeral 54. The peak load is indicated at $p$, and the negative rate portion of the curve is indicated in dotted lines at $n$.

Analyzing the curve 54, it will be seen that although this spring developed a satisfactory maximum load, that it had too great a negative rate of deflection, and, once deflected to zero load, would not return to its original unstressed position.

Another conical spring, having a thickness of .090 inch, and a height of .165 inch, was tested and found to have the characteristics indicated in the curve 56 in Fig. 17, and indicates that the spring developed a maximum load of 700 pounds, far below the requirements of the type under consideration, and a negative rate range of approximately .080 inch, which falls somewhat short of the requirements of the objects herein aimed at, since this makes no provision for retaining the operating range completely on a negative rate basis as the operating range shifts during the wearing down of the friction facing.

It appears then that, other factors remaining the same, an increase in height will increase the load capacity but shorten the useful portion of the deflection range (the low or unidirectional rate portion). This is well illustrated by comparison of the curves 56 and 54. The curve 56 has what may be termed a useful range of negative deflection, although a range far short of accomplishing the aims of the present invention. However, the load capacity of this curve is completely inadequate as has been noted hereinbefore. By increasing the height of this spring from .165 inch to .224 inch, other factors remaining substantially the same, the load capacity was brought up to a satisfactory level, but the useful range of deflection was almost completely wiped out.

From the results stated above, it appeared that in a spring restricted to the proportions of width and thickness stated, the principles of construction embodied in the conventional Belleville washer, were wholly inadequate, and that something additional would be required in order to provide an operative spring having the desired resilience, to say nothing of achieving the desired range of negative rate deflection and durability.

The conception of the present invention arose through the attempt to solve this problem of achieving the desired combination of high load capacity, ample range of low rate deflection, and ability to withstand repeated flexings without failure, in a spring restricted in diameter to approximately two-thirds of the diameter or less than 50% the area of the average prior springs.

The present invention involves the discovery that by imparting to the spring a very substantial crown (displacement of its intermediate region away from the imaginary cone 58 joining its inner and outer peripheries, as indicated at $c$ in Fig. 2) the height can be increased far beyond the limits imposed by the prior art springs, without losing control of the low rate range of deflection.

Furthermore, we have discovered that by the proper proportioning of the thickness, crown and height of the spring, it is not only possible to incorporate in a spring of the restricted proportions under consideration, the combination of a usable range of low, undirectional rate deflection with ample resilience, but it is possible to go far beyond this accomplishment and actually produce a negative rate of deflection extending over a range that is increased far beyond the range of the known prior art springs, making it possible to operate the clutch entirely within the negative rate range of deflection, and have ample reserve of negative rate deflection to take care of the gradual release of compression, and the consequent shifting of the operating range to a lower range of deflection, as the friction facings of the driven element 20 wear down. This will be understood by referring to the curve 60 of Fig. 17, representing the deflection characteristics of a spring of the type shown in Fig. 8, having a thickness of .090 inch, a height of .267 inch (more than 60% higher than that of the spring represented at 56) and a crown of .069 inch. This curve was chosen because of the close correspondence of factors of height and thickness to those of the prior art springs. As is apparent from the graph, the spring has a maximum load capacity somewhat higher than that of the conical spring graphed at 54, and more than twice that of the conical spring graphed at 56; and furthermore, has a range of negative rate deflection of approximately .180 inch as contrasted to the relatively short range of approximately .080 inch of the curve 56, and incomparably longer than that of the spring graphed at 54, which, although it develops a satisfactory maximum load capacity, has practically no controllable range of negative rate deflection whatsoever.

Referring further to the curve 60, it will be apparent that the operating range may be established sufficiently beyond the peak $p$ of the curve so as to be wholly within the negative rate range, and to remain within that range as it gradually shifts toward the peak of the curve under the wearing down of the friction faces. The original operating range is indicated between the line E, representing the deflection at the point of engagement, and the line R, representing the deflection at the point of release. The operating range may shift, as the clutch wears down, until it is positioned between the deflection limits E' and R'.

A particular advantage in maintaining the operating range within the range of negative rate deflection during the entire life of the friction facing, is that the load of the spring gradually increases as the operating range shifts higher upon the deflection curve, thereby compensating for loss of friction occurring through the smoothing of the friction faces, and for any loss of load through fatigue.

Figure 11:
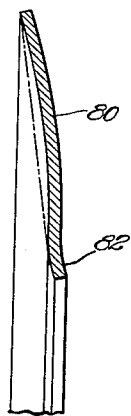
Fig. 11 is a sectional view of a spring embodying another modification of the invention.

An important feature of the invention is the curving of the spring in the same direction throughout substantially its entire width, so that the crown lies largely on one side of the imaginary cone 58 joining its two peripheries. While the invention is not restricted to a single curvature through the entire width of the spring, but may on the contrary involve a double curve as shown in Fig. 11, the preferred form of the invention embodies a single curvature.

As the spring is deflected, the curvature of the crown will increase, indicating that deflection is accompanied by flexing of the intermediate region. It appears that the flexing reduces the strain upon the peripheral regions and that the intermediate region does a substantial proportion of the useful work of the spring, as contrasted to the conventional conical spring wherein the intermediate region functions somewhat as a series of relatively unyielding struts, forcing the peripheral regions to do most of the work and subjecting them to a much greater stress for a given amount of deflection.

A manner of explaining the great extension of useful range, is to visualize the crowned spring as an infinite series of successive coaxial conical springs, each of which goes through its zero point at a different point on the deflection curve, thus making it impossible for a sufficiently large proportion of the spring to achieve a negative load at the same time to allow the aggregate load to approach zero. In this connection it may be noted that after crossing the plane of the outer periphery, the inner peripheral region tends to expand and be relieved of its compressive forces, and may even reach a point where its internal stresses change to circumferential tension instead of compression.

The depth of the crown is an important factor in the relationship between the several characteristics of the spring. It appears that the most important ratio for determining the crown is the ratio between crown and thickness. For best results, this ratio should be in the neighborhood of somewhat less than 1:1 in a spring having the general characteristics and proportions described above. In an example that has been given, it will be noted that the crown (.069 inch) bears a ratio to the thickness (.090 inch) of approximately 7:9 or approximately .77:1.

Figure 3:
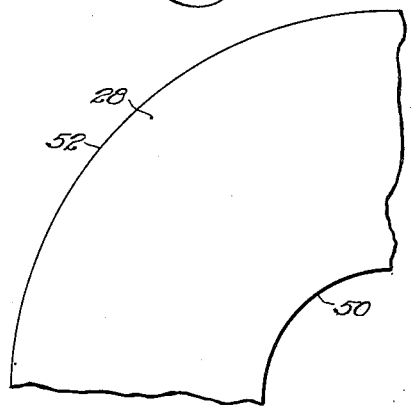
Fig. 3 is a front elevation of the same.
Figure 4:
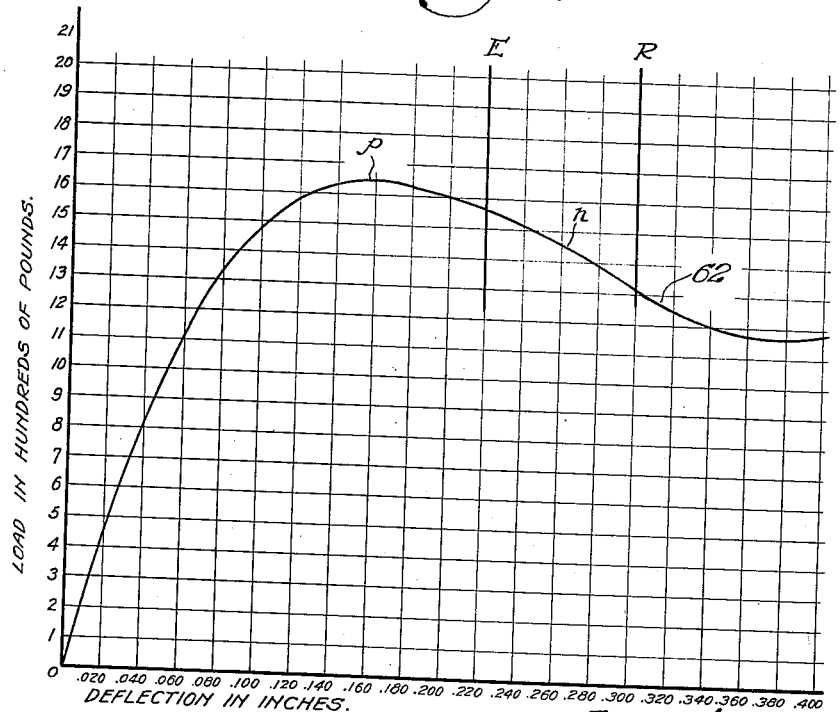
Fig. 4 is a graph showing the deflection curve of the spring shown in Figs. 2 and 3.

The invention may be embodied in various slightly modified forms, all employing, however, the general principles of construction set forth above. For example, the spring may be simply a plain, imperforate, cupped washer as shown in Figs. 2 and 3. Actual tests of such a spring, having a thickness of .098, a height of .264, and a crown of .070 inch, gives the results shown by the curve 62 in Fig. 4. The curve 62 indicates a maximum load capacity of about 1630 pounds, and a useful deflection range of approximately .200 inch. These characteristics were maintained throughout more than one million cycles of deflection without failure, which is far beyond the requirements of the life span of the ordinary motor vehicle. The characterisics of the curve 62 are quite similar to that of the curve 60.

The spring 64 shown in Fig. 6 differs from the plain spring of Fig. 2 in that its inner peripheral region is provided with a series of slits 66, terminating in openings 68, the purpose of which is to prevent the slits 66 becoming elongated. The edges of the tongues 70 formed between the slits 66 are in contact with each other normally so as to carry the compressive load during most of the range of deflection of the spring. When the stresses in the inner region of the spring commence to change from compression to tension, however, the slits 66 will open thus relieving the tension. This construction has a tendency to avoid the occurrence of cracks in the inner peripheral region of the spring as a result of prolonged flexing. It also has a tendency to decrease the load capacity of the spring, which may under certain circumstances become undesirable, although its load capacity is ample for the average dry clutch. The deflection curve of this spring is shown at 72 in Fig. 7, and indicates sufficient load capacity and ample useful range. The spring tested had a thickness of .109 inch, a height of .268 inch, a crown of .090 inch, and a ratio of crown to thickness of .82:1.

Figure 9:
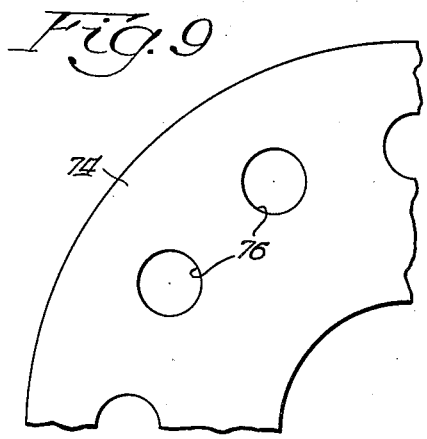
Fig. 9 is an elevation of the same.
Figure 10:
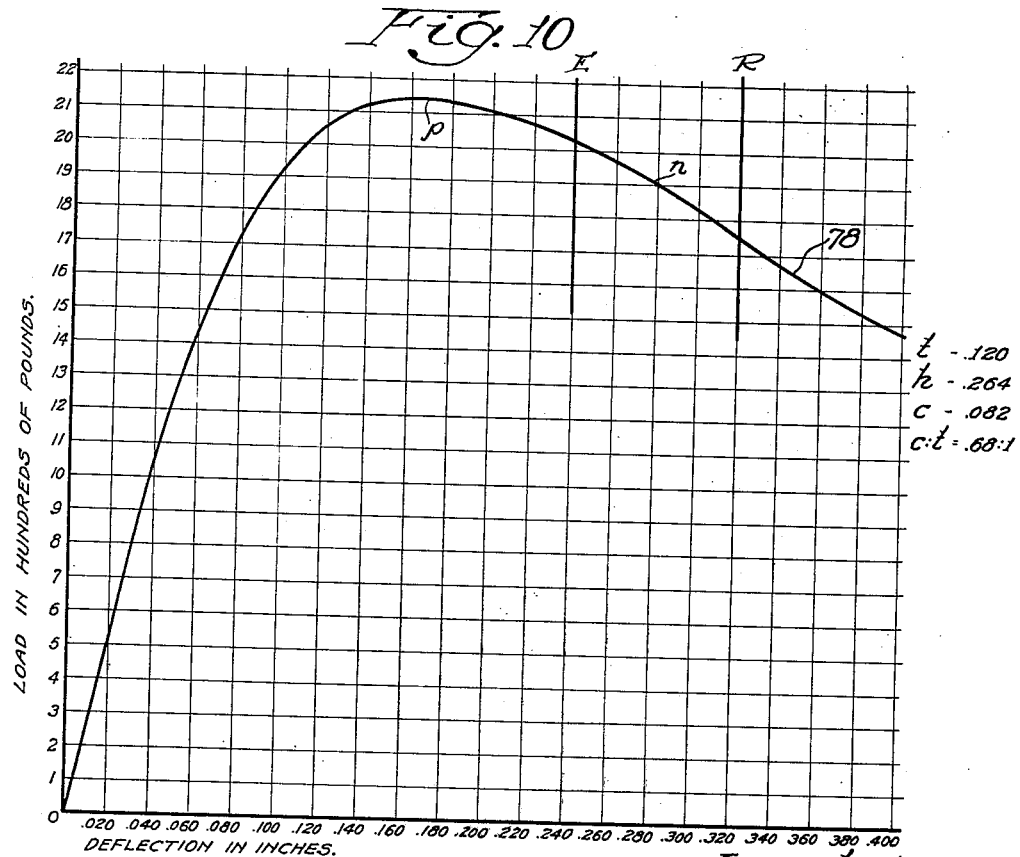
Fig. 10 is a graph showing the deflection curve of the spring shown in Figs. 8 and 9.

In the form of the invention shown in Figs. 8 and 9, the yieldability of the intermediate region of the spring is increased by removing metal from said region. This is accomplished by providing a series of perforations 76, arranged on a common circumference somewhat closer to the outer periphery than to the inner, and having an aggregate width considerably less than the circumference on which they are arranged. By reducing the area of the intermediate region, thereby rendering it more flexible, it was possible to considerably increase the thickness of the spring and thereby to considerably increase its load capacity. The curve 78 of this spring, shown in Fig. 10, indicates a maximum load capacity of better than 2,100 pounds, and a useful range of considerably more than .200 inch.

The spring tested had a thickness of .120 inch, a height of .264 inch, a crown of .082 inch, and a ratio of crown to thickness of .68:1.

Figure 12:
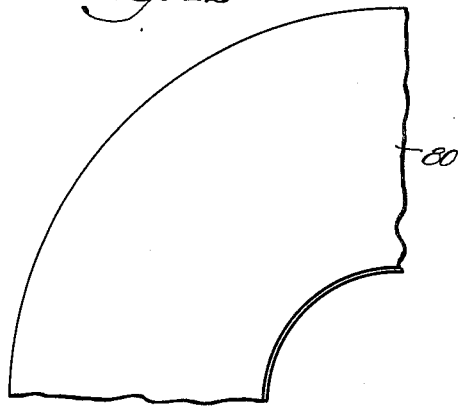
Fig. 12 is an elevation of the same.
Figure 13:
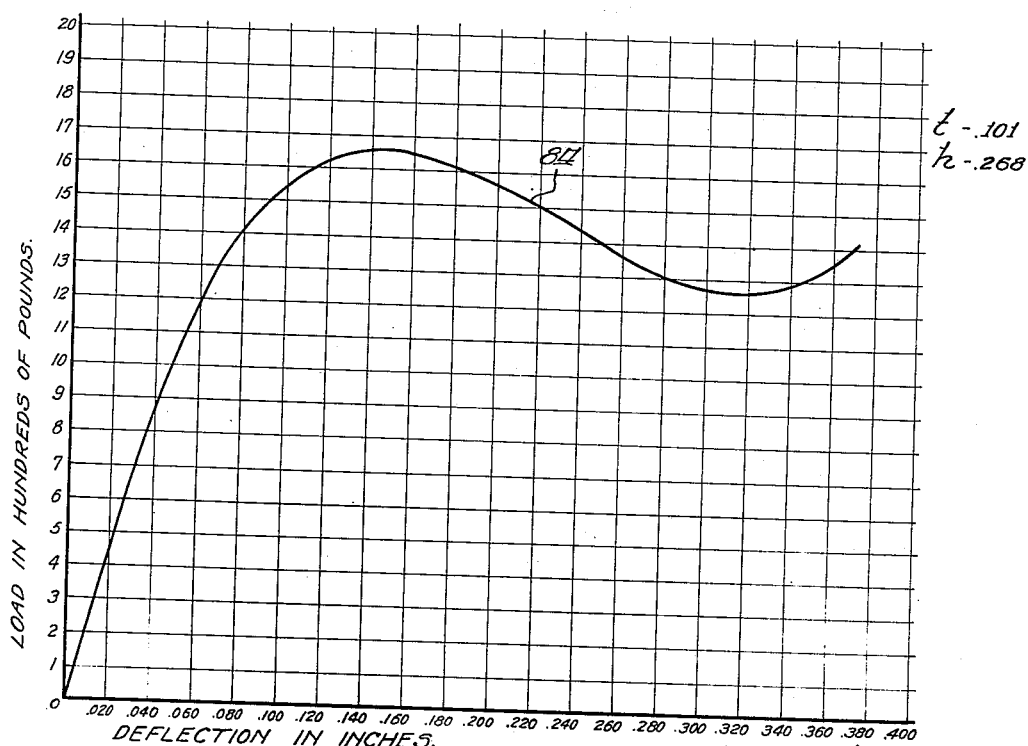
Fig. 13 is a graph showing the deflection curve of the spring shown in Figs. 11 and 12.

The spring 80 shown in Figs. 11 and 12 differs from the plain springs of Figs. 2 and 3 in having its inner peripheral region provided with a reversely curved collar 82. The collar 82 tends to reduce the stress concentration at the inner periphery, and as a result, improves the fatigue life of the spring. It was found possible to considerably increase the load capacity of this spring by increasing the thickness. The collar 82 tends to decrease the range of negative rate deflection. The curve 84, indicating the results of tests on a spring of this type having a thickness of .101 inch, a height of .268 inch, and a crown of .071 inch, shows a good load capacity of approximately 1,650 pounds, and a moderately good deflection range of approximately .160 inch.

Figure 14:
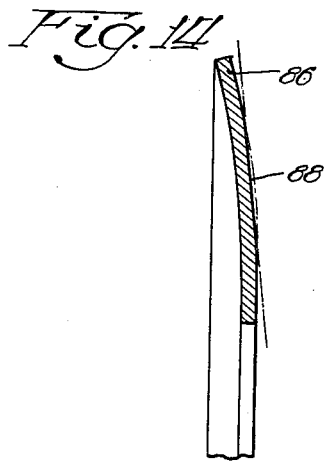
Fig. 14 is a sectional view of a spring embodying another form of the invention.
Figure 15:
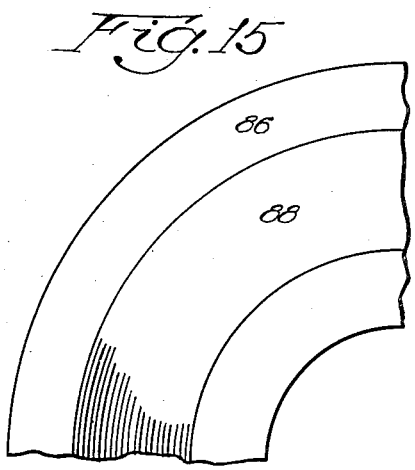
Fig. 15 is an elevation of the same.
Figure 16:
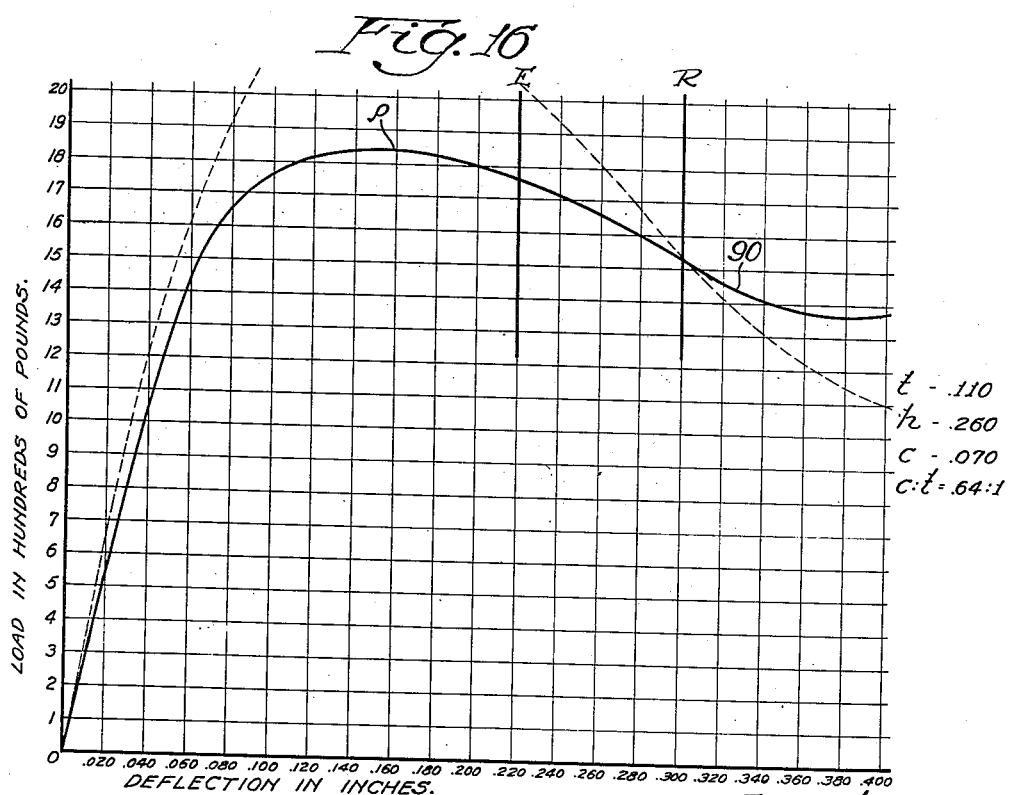
Fig. 16 is a graph showing the deflection curve of the spring shown in Figs. 14 and 15.

The spring shown in Figs. 14 and 15 has the intermediate region reduced by flattening the convex sides thereof as at 88. This flattening makes it possible to employ a stock of even greater thickness than that of previous springs, and a spring of this type having a thickness of .110 inch, a height of .260 inch, a crown of .070 inch, and a ratio of crown to thickness of .64:1, shows as indicated in the curve 90, a maximum load capacity of approximately 1,840 pounds, and a useful deflection range of approximately .200 inch. The broken line 90a indicates the characteristics of the same spring prior to the reduction.

In the application of the spring in a clutch as shown in Fig. 1, it is preloaded to a point well beyond the maximum or peak load $p$. This reduces the height $h$ of the spring, causing the inner peripheral region, which, in its unstressed state may have been substantially tangent to its plane, to become reentrant. Thus preloaded, the spring will exert a pressure against the pressure plate 26 corresponding to the load at the point E, which, in the curve 62, is approximately 1,560 pounds.

In the further deflection of the spring during clutch release operation, the load will drop continuously until the completely released point R is reached, whereat the load, as read on the curve 62, will be approximately 1,300 pounds. Interpreting this in terms of operation of the clutch pedal by the operator, it will be apparent that as he depresses the pedal, the build-up of pedal pressure will be at a materially lower rate than in a conventional clutch. There would actually be a constant reduction in pedal pressure except for the fact that the driven plate of the conventional clutch embodies high positive rate cushioning means which, added algebraically to the negative rate of the washer type spring, results in a low positive rate pedal pressure during clutch release, which is desirable for the reason that a moderate decrease in load as the pedal is released, assists the operator in "feeling" the clutch into engagement. When the clutch plates separate, however, in the clutch releasing operation, the pedal pressure will be considerably reduced, and this is especially advantageous when the clutch pedal must be held down for any period of time.

Figure 18:
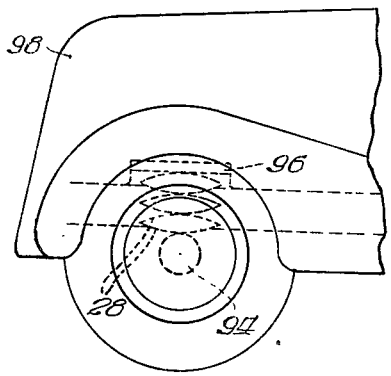
Fig. 18 is a schematic view illustrating the application of a group of springs having the characteristics of the invention, in a motor vehicle spring suspension.
Figure 19:
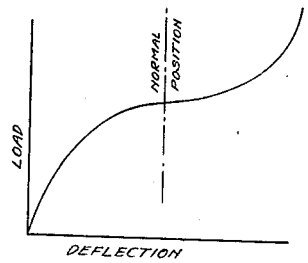
Fig. 19 is a graph indicating the deflection curve of the springs of Fig. 18, and the method of loading the springs.

The invention may be applied also to a spring suspension as shown in Fig. 18. For this purpose, a series of the springs may be arranged in accordion-like formation as shown, so as to develop an aggregate deflection range that is ample for the purpose and engaged between an axle 94 and a frame abutment 96 of a motor vehicle 98. Preloaded by the sprung weight of the vehicle, which in the average medium-priced vehicle may approximate from 2000 to 3000 pounds, the springs 28, which may be designed to have a very slightly positive rate, close to zero, in the middle of the operating range, and a more sharply ascending positive rate at the ends of the operating range, as shown in Fig. 19, will give a very desirable combination of extremely light cushioning action throughout the middle zone of deflection and sharply stiffening resistance in the final zone of deflection, thus to readily absorb the small shocks produced by the travelling of the vehicle over slightly rough surface, and gradually building up the resistance so as to take care of heavier impacts with a gradual change from the light cushioning to the stiff cushioning action.

It will be understood that other uses may be found for springs of this type. In particular, it is desired to point out that although as has been previously stated, the invention had its conception in the attempt to meet the problem of combining sufficient resilience and ample useful deflection range in a spring of small diameter, the principles of the invention are applicable to springs of widely varying diameters and springs wherein the proportion between width and thickness may vary considerably from those stated above. In all such cases, the desirable results of the invention may be achieved by observing the principle of crowning the spring in radial cross-section, so that the major portion of the spring lies on the side of the imaginary conical surface joining its periphery, and maintaining the ratio of crown to thickness within the limits specified. These conditions being satisfied, the height of the spring may be increased far beyond the limits previously imposed by the characteristics of conical springs, without losing control of the useful range of deflection, it being desirable, in general, to increase the crown roughly in proportion to the increase in height so as to maintain the deflection rate under control. A much longer range of unidirectional rate of deflection will be obtained than is possible with the conical disc spring. This rate may be made negative, or zero, or positive as desired by varying the ratio of crown to height of the spring. While it seems probable that there is a definite limit to which the height of the spring can be increased in proportion to its other dimennsions, that limit has not as yet been definitely ascertained, and it does not appear to be necessary for the purposes of the present invention to define such limit. It can at least be stated with definiteness that within the limits of height specified herein with respect to the various modifications illustrated, and probably considerably beyond these limits, desirable attributes of the invention may be obtained by observing the rules stated hereinbefore.

We claim:

1. A highly resilient, washer type spring having a broad range of uni-directional rate deflection, said spring being roughly conical and crowned in radial cross-section with the crown curvature disposed largely on one side of a straight line joining its inner and outer peripheries, the dimensions of said spring falling substantially within the following proportions: maximum diameter 6; thickness .085–.12; crown, .05–.1; axial height .25–.27.

2. A highly resilient, washer type spring, roughly conical in shape and curved in radial cross-section so that a large majority of its area lies on one side of the imaginary cone joining its inner and outer peripheries, said spring having a ratio between thickness and diameter falling substantially within the limit .085:6 and .120:6, the inner and outer peripheral regions of said spring being of substantially the same thickness and the intermediate region of said spring being of reduced thickness and adapted to bow during the flexing of the spring.

3. A highly resilient, washer type spring, roughly conical in shape and curved in radial cross-section so that a large majority of its area lies on one side of the imaginary cone joining its inner and outer peripheries, said spring having a ratio between thickness and diameter falling substantially within the limit .085:6 and .120:6, said spring including a reversely curved collar portion forming the inner peripheral region thereof.

4. A highly resilient, washer type spring, roughly conical in shape and curved in radial cross-section so that a large majority of its area lies on one side of the imaginary cone joining its inner and outer peripheries, the dimensions of said spring being roughly in proportion to the following quantities: maximum diameter 6; thickness .1; crown .1; axial height .25.

5. A highly resilient, washer type spring, roughly conical in shape and curved in radial cross section so that a large majority of its area lies on one side of the imaginary cone joining its inner and outer peripheries, said spring having a ratio between thickness and diameter falling substantially within the limit .085:6 and .120:6, said spring comprising circumferentially continuous inner and outer peripheral regions connected by a circumferentially interrupted intermediate region adapted to bow during the flexing of the spring.

6. A highly resilient, washer type spring having a broad range of uni-directional rate of deflection, said spring being roughly conical in shape and curved in radial cross-section, with the curvature disposed largely on one side of a straight line joining its inner and outer peripheries, said spring having a ratio between thickness and outer diameter falling substantially within the limits of .085:6 and .120:6 and having a ratio between its crown of curvature and thickness not substantially greater than 1:1, the inner and outer peripheries of the spring being of substantially the same thickness and the intermediate region of said spring being of reduced thickness and adapted to bow during the flexing of the spring.

7. A highly resilient, washer type spring having a broad range of uni-directional rate of deflection, said spring being roughly conical in shape and curved in radial cross-section, with the curvature disposed largely on one side of a straight line joining its inner and outer peripheries, said spring having a ratio between thickness and outer diameter falling substantially within the limits of .085:6 and .120:6 and having a ratio between its crown of curvature and thickness not substantially greater than 1:1, said spring including a reversely curved collar portion forming the inner peripheral region thereof.

8. A highly resilient, washer type spring having a broad range of uni-directional rate of deflection, said spring being roughly conical in shape and curved in radial cross-section, with the curvature disposed largely on one side of a straight line joining its inner and outer peripheries, the dimensions of said spring being roughly in proportion to the following quantities: maximum diameter—6; thickness—.1; crown—.1; axial height—.25.

9. A highly resilient, washer type spring having a broad range of uni-directional rate of deflection, said spring being roughly conical in shape and curved in radial cross-section, with the curvature disposed largely on one side of a straight line joining its inner and outer peripheries, said spring having a ratio between thickness and outer diameter falling substantially within the limits of .085:6 and .120:6 and having a ratio between its crown of curvature and thickness not substantially greater than 1:1, said spring comprising circumferentially continuous inner and outer peripheral regions connected by a circumferentially interrupted intermediate region adapted to bow during the flexing of the spring.

10. A highly resilient, washer type spring having a broad range of uni-directional rate of deflection, said spring being roughly conical and crowned in radial cross-section with the crowned curvature disposed largely on one side of a straight line joining its inner and outer peripheries, said spring having a ratio between crown, axial height, thickness and diameter in the neighborhood of .05–.1:.25–.30:.08–.12:6.

HAROLD NUTT.
RICHARD L. SMIRL.